R. G. LAWRENCE.
SHELL RIM STRETCHER.
APPLICATION FILED APR. 30, 1921.
1,432,605.
Patented Oct. 17, 1922.
2 SHEETS—SHEET 1.
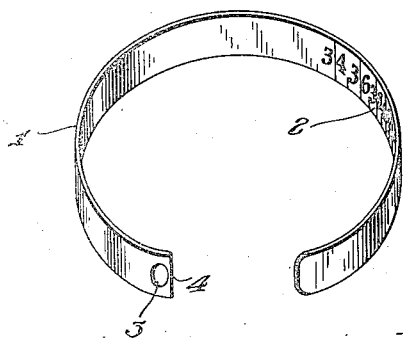
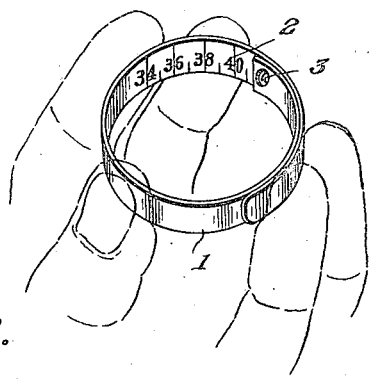
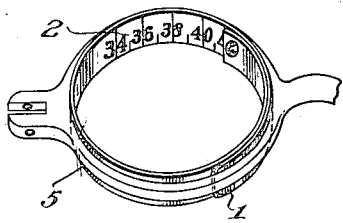
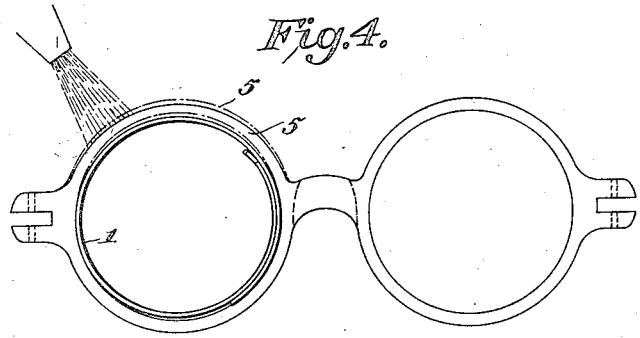
Inventor:
R. G. Lawrence,
by Eugene E. Brown
Atty.

R. G. LAWRENCE.
SHELL RIM STRETCHER.
APPLICATION FILED APR. 30, 1921.
1,432,605.
Patented Oct. 17, 1922.
2 SHEETS—SHEET 2.
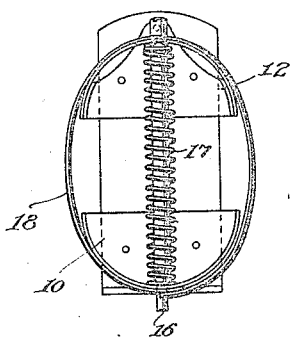
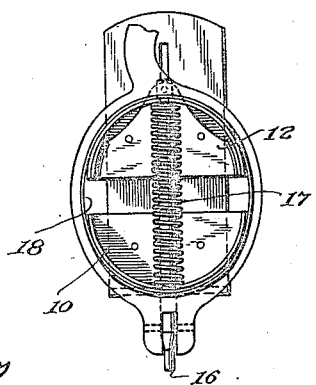
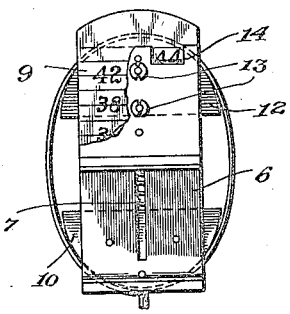
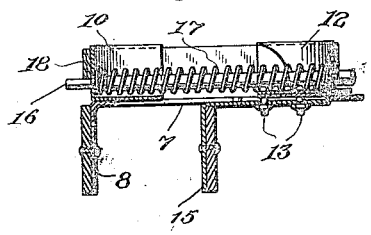
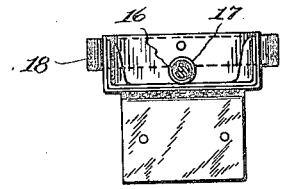
Inventor:
R. G. Lawrence,
by Eugene C. Brown
Atty.

Patented Oct. 17, 1922.

1,432,605

UNITED STATES PATENT OFFICE.

RICHARD G. LAWRENCE, OF WINSTED, CONNECTICUT.

SHELL-RIM STRETCHER.

Application filed April 30, 1921. Serial No. 465,908.

*To all whom it may concern:*

Be it known that I, RICHARD G. LAWRENCE, a citizen of the United States, residing at Winsted, in the county of Litchfield and State of Connecticut, have invented certain new and useful Improvements in Shell-Rim Stretchers, of which the following is a specification.

This invention relates to rim stretchers and particularly to a device for enlarging flexible spectacle rims to fit desired sizes of lenses.

Flexible spectacle rims are made in certain stock sizes which do not always fit the lenses which are to be placed in them and it is therefore necessary to enlarge the rims to a desired size. It is not difficult to stretch such rims as they soften under the influence of heat and can be stretched easily when soft. But it is essential that the stretching be carried only far enough to enable the lens to be properly mounted therein.

The objects of my invention therefore are to provide a device of this nature by means of which exact dimensions may be given to a rim, and further to provide one which is automatic in its action.

In carrying out my invention I provide an expanding resilient stretching element insertible in the rim to be enlarged and which expands against the inner periphery of said rim and is so arranged that expansion of the stretching element and enlargement of the rim takes place automatically as the rim is softened. I also provide graduations so placed as to enable the operator to know just when to withdraw the heat and stop the stretching in order to get a desired size of rim.

In the accompanying drawings, Fig. 1 is a perspective view of the simplest and preferred form of my invention shown as an expanded resilient strip of metal; Fig. 2 is a perspective view of the resilient strip in a contracted position as it is held manually for insertion in a rim to be enlarged; Fig. 3 is a perspective view of the stretcher in position in a spectacle rim; Fig. 4 is a plan view of a device in position in a rim disclosing in dotted line the form assumed by the rim as it is softened and the stretcher expands; Fig. 5 is a plan view of a modified form of my invention in its normal expanded condition; Fig. 6 is a plan view of a device shown in Fig. 5 in a contracted condition in a rim preparatory to softening the rim; Fig. 7 is a bottom plan view of the modified form of stretcher partially broken away; Fig. 8 is a longitudinal sectional view of the modified form and Fig. 9 is a transverse sectional view of the same.

The form of my invention disclosed in Figs. 1 to 4 comprises a resilient steel spring or band 1 being normally expanded as shown in Fig. 1 and tending to expand to this position upon constriction or compression as in Fig. 2.

This band is provided on its inner surface of one end with graduations 2 and toward the end opposite the graduations with an opening 3. A very thin strip of metal 4 closes the opening and acts as a gauge or guide for the graduations, the proximity to the next succeeding number being observed through the opening.

As shown in Fig. 2 the resilient band is constricted or compressed and inserted in spectacle rim 5 in which it tends to expand but is unable to do so while the rim is in a cold and hard condition. When in this position the graduations 2 are visible on the inside of the band up to the line formed by strip 4 and the opening 3 discloses the next graduation.

With the device in the rim as shown in Fig. 3 the rim is softened as by heat applied in any preferred manner. As the rim softens its resistance to stretching decreases and the spring begins to expand and enlarge the rim. By observation of the uncovered graduation and of the graduation seen through opening 3 the operator is enabled to know the size the rim has attained and to withdraw the heat just before reaching the desired size as indicated by the thin strip of metal 4 acting as a gauge upon a graduation 2. Withdrawal of the heat results in almost immediate cooling of the rim 5 and the arresting of this stretching operation. The overlapping edges of the band are thinned to prevent the formation of wrinkles in the rim.

In the modified form disclosed in Figs. 5 to 9, I provide a supporting strip 6 having a longitudinally extending guide slot 7 and terminating in a depending flange 8, this supporting strip has graduations 9 on the bottom surface in a semi-circular flange expanding section 10 riveted to the top surface.

A sliding strip 11 carries a secondary semi-circular expanding section 12 supported by rivets or screws 13 sliding in the guide slot 7 and is recessed on the end as at 14 to act as a guage on the graduations 9 as shown in Fig. 7. This strip 12 also has a depending flange 15 and flanges 8 and 15 act as finger grips by which to force the two expanding sections together.

A pin 16 is anchored in the flange of section 12 and passes through an opening in the flange of section 10 and acts as a guide for a coil spring 17 normally forcing the two sections apart. A contractile spring or band 18 is riveted in the center to the flange of section 12 and the two ends extend around and overlap on the flange of section 10.

It will be seen that as coil spring 15 is compressed or contracted by manually pressing the two flanges 8 and 15 together the spring 18 will contract about the two said flanges on the expanding section and as pressure is released the coil spring being much stronger than the contractile spring will force the two sections apart to the position shown in Fig. 5.

The operation is the same as in the preferred form for as shown in Fig. 6 the stretcher is collapsed and inserted in a rim 5 and as the rim is softened the stretcher enlarges automatically as in the preferred form.

The advantages of my stretcher will be especially appreciated by opticians. Not only is the device, in either form, exceedingly simple in structure, but it has the advantage of enabling the operator to stretch both rims of a pair of spectacles simultaneously.

I claim:—

1. A spectacle rim stretcher comprising an unrestrained normally expanded element adapted to be compressed for insertion into a rim to be stretched and adapted to automatically expand as an external resistance to distention of such rim is decreased and means for indicating the amount of expansion of said element.

2. A spectacle rim stretcher comprising a resilient automatically expanding band having graduations at one end and adapted to be constricted to a substantially annular form and arranged so that when constricted the end of the band is over said graduation for indicating the amount of expansion of said band.

3. A spectacle rim stretcher comprising a resilient expanding spring having an opening at one end thereof and graduations at the other end and so arranged that the construction of the spring brings the opening over said graduations for indicating the amount of expansion when the spring is inserted and expanded in a rim.

In testimony whereof I affix my signature.

RICHARD G. LAWRENCE.